(12) United States Patent
Labour (10) Patent No.: US 8,675,000 B2
(45) Date of Patent: *Mar. 18, 2014

(54) COMMAND BUFFERS FOR WEB-BASED GRAPHICS RENDERING

(75) Inventor: Antoine Labour, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 12/267,125

(22) Filed: Nov. 7, 2008

(65) Prior Publication Data

US 2010/0118039 A1 May 13, 2010

(51) Int. Cl.
*G06T 1/60* (2006.01)
*G06F 15/167* (2006.01)
*G09G 5/36* (2006.01)

(52) U.S. Cl.
USPC .......................... 345/522; 345/541; 345/547

(58) Field of Classification Search
None
See application file for complete search history.

(56) References Cited

U.S. PATENT DOCUMENTS

| | | | |
|---|---|---|---|
| 5,283,899 A * | 2/1994 | Cook et al. ................ | 718/102 |
| 5,974,549 A | 10/1999 | Golan | |
| 6,128,774 A | 10/2000 | Necula et al. | |
| 6,275,938 B1 | 8/2001 | Bond et al. | |
| 6,393,538 B2 | 5/2002 | Murayama | |
| 6,507,904 B1 | 1/2003 | Ellison et al. | |
| 6,738,469 B1 | 5/2004 | Peirce et al. | |
| 7,984,511 B2 * | 7/2011 | Kocher et al. ................ | 726/27 |
| 2003/0126311 A1 | 7/2003 | Kushnirskiy et al. | |
| 2004/0123117 A1 | 6/2004 | Berger | |
| 2006/0114260 A1 | 6/2006 | Diard | |
| 2006/0174077 A1 | 8/2006 | Abadi et al. | |
| 2007/0244990 A1 | 10/2007 | Wells | |
| 2007/0283324 A1 * | 12/2007 | Geisinger ..................... | 717/120 |
| 2008/0036763 A1 * | 2/2008 | Chen et al. ................... | 345/422 |
| 2008/0042923 A1 | 2/2008 | De Laet | |
| 2008/0083030 A1 | 4/2008 | Durham et al. | |

(Continued)

FOREIGN PATENT DOCUMENTS

| CN | 101067827 A | 11/2007 |
|---|---|---|
| EP | 1681656 A1 | 7/2006 |

(Continued)

OTHER PUBLICATIONS

Erlingsson, U., M. Abadi, M. Veable, M. Budiu, and G. Necula, "XFI: Software guards for system address spaces." in *ODSI '06: 7th Symposium on Operating Systems Design and Implementation*, pp. 75-88, Nov. 2006.

(Continued)

*Primary Examiner* — Kim M Tung
*Assistant Examiner* — Michelle Chin
(74) *Attorney, Agent, or Firm* — Sterne, Kessler, Goldstein & Fox P.L.L.C.

(57) ABSTRACT

The described embodiments provide a system that renders graphics for a computer system. During operation, the system loads a software client and a software service in the computing system. Next, the system receives a set of rendering commands from the software client in a command buffer, wherein the rendering commands include at least one of a state change command, a resource allocation command, a direct memory access (DMA) command, buffer data, and a synchronization command. Finally, the system uses the software service to render an image corresponding to the rendering commands by reading the rendering commands from the command buffer and executing the rendering commands.

38 Claims, 6 Drawing Sheets

(56) References Cited

U.S. PATENT DOCUMENTS

| | | | |
|---|---|---|---|
| 2008/0104195 A1 | 5/2008 | Hawkins et al. | |
| 2008/0139301 A1 | 6/2008 | Holthe | |
| 2008/0144903 A1 | 6/2008 | Wang et al. | |
| 2009/0002380 A1* | 1/2009 | Langyel et al. | 345/522 |
| 2009/0119578 A1 | 5/2009 | Relyea et al. | |
| 2009/0122062 A1 | 5/2009 | Kilpatrick | |
| 2009/0282474 A1 | 11/2009 | Chen et al. | |
| 2009/0282477 A1 | 11/2009 | Chen et al. | |
| 2010/0013842 A1 | 1/2010 | Green et al. | |
| 2010/0118038 A1 | 5/2010 | Labour et al. | |
| 2013/0033508 A1 | 2/2013 | Labour | |

FOREIGN PATENT DOCUMENTS

| | | |
|---|---|---|
| EP | 1 921 584 A2 | 5/2008 |
| JP | 2002/108600 A | 4/2002 |
| JP | 2008/123519 A | 5/2008 |
| WO | WO 0180098 A2 | 10/2001 |
| WO | WO 2006114898 A1 | 11/2006 |
| WO | WO 2008040123 A1 | 4/2008 |

OTHER PUBLICATIONS

Ford, B., "VXA: A virtual architecture for durable compressed archives." in *USENIX File and Storage Technologies*, pp. 1-14, Dec. 2005.

McCamant, S., and G. Morrisett, "Evaluating SFI for a CISC architecture." In *15th USENIX Security Symposium*, pp. 1-16, Aug. 2006.

Necula, G., "Proof carrying code." In *Principles of Programming Languages*, pp. 1-14, 1997.

Prasad, V., W. Cohen, F.C. Eigler, M. Hunt, J. Keniston, and J.B. Chen, "Locating system problems using dynamic instrumentation." In *2005 Ottawa Linux Symposium*, pp. 49-64, Jul. 2005.

Stegmaier, Simon et al., "A Generic Solution for Hardware-Accelerated Remote Visualization", pp. 1-9, *IEEE TCVG Symposium on Visualization*, 2002.

Wahbe, Robert, Steven Lucco, Thomas E. Anderson, and Susan L. Graham, "Efficient software-based fault isolation," *ACM SIGOPS Operating Systems Review*, 27(5):203-216, Dec. 1993.

International Search Report of the International Searching Authority for International Application No. PCT/US2009/049678, Korean Intellectual Property Office, Republic of Korea, mailed on Feb. 17, 2010.

Written Opinion of the International Searching Authority for International Application No. PCT/US2009/049678, Korean Intellectual Property Office, Republic of Korea, mailed on Feb. 17, 2010.

International Search Report of the International Searching Authority for International Application No. PCT/US2009/063226, Korean Intellectual Property Office, Republic of Korea, mailed on Jun. 10, 2010.

Written Opinion of the International Searching Authority for International Application No. PCT/US2009/063226, Korean Intellectual Property Office, Republic of Korea, mailed on Jun. 10, 2010.

Supplementary European Sear Report, dated May 24, 2013, European Patent Application No. 09825330.5, European Patent Office, Netherlands.

English-Language Translation for Chinese Patent Publication No. Cn 101067827 A, published Nov. 7, 2007; 14 pages.

International Search Report and Written Opinion mailed Jun. 21, 2010 in International Application No. PCT/US2009/063223, Korean Intellectual Property Office, Republic of Korea; 7 pages.

Chinese Office Action (with English-Language Translation) directed to related Chinese Patent Application No. 200980150261.9, mailed Jul. 2, 2013; 18 pages.

English-Language Abstract for Chinese Patent Publication No. CN 101067827 A, published Nov. 7, 2007; 1 page.

* cited by examiner

COMMAND BUFFERS FOR WEB-BASED GRAPHICS RENDERING

RELATED APPLICATION

The subject matter of this application is related to the subject matter in a co-pending non-provisional application by inventors Robin Green, Evangelos Kokkevis, Matthew Papakipos and Gregg Tavares and filed 16 Jul. 2008 entitled "Web-Based Graphics Rendering System," having Ser. No. 12/174,586.

The subject matter of this application is also related to the subject matter in a co-pending non-provisional application by J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008.

The subject matter of this application is also related to the subject matter in a co-pending non-provisional application by J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008.

BACKGROUND

1. Field

The present embodiments relate to graphics rendering techniques. More specifically, the present embodiments relate to techniques for using command buffers in web-based rendering of graphics.

2. Related Art

Computer systems often include a number of native applications that require complex three-dimensional (3D) scenes to be rendered, such as computer games and computer-aided design (CAD) systems. To render 3D scenes, these native applications may use graphics application programming interfaces (APIs) that direct calculations related to graphics rendering to dedicated graphics processing units (GPUs). The additional computational power provided by these GPUs can greatly improve graphics quality and throughput.

Web applications, which have become more prevalent in recent years, are typically written in scripting languages that are unable to utilize low-level graphics APIs that provide graphics hardware acceleration. Instead, graphics rendering for web applications is typically performed by CPUs instead of GPUs. The software-based nature of web-based graphics rendering may thus limit the graphics capabilities of web applications. However, unlike native applications, web applications provide a number of advantages. For example, web applications are capable of executing on multiple platforms, do not require installation, and can be more secure than native applications.

The tradeoff between web application security and native graphics performance may be addressed using a browser plugin that renders graphics for web applications by interfacing with a local graphics hardware device (e.g., a GPU). Such a plugin may correspond to a complex software system that includes various mechanisms for obtaining scene information from the web applications; storing the scene information; processing the scene information using transforms, effects, and shaders; and sending commands to the graphics hardware for rendering the scene. Consequently, the plugin itself may include a number of potential security vulnerabilities that may be exploited by other applications and/or bugs that may lead to system failures.

Hence, what is needed is a mechanism for safely executing the plugin while maintaining communication between the plugin and graphics hardware.

SUMMARY

Some embodiments provide a system that renders graphics for a computer system. During operation, the system loads a software client and a software service into the computing system. Next, the system receives a set of rendering commands from the software client in a command buffer, wherein the rendering commands include at least one of a state change command, a resource allocation command, a direct memory access (DMA) command, buffer data, and a synchronization command. Finally, the system uses the software service to render an image corresponding to the rendering commands by reading the rendering commands from the command buffer and executing the rendering commands.

In some embodiments, the system also writes the buffer data to a shared memory buffer using the software client and further executes the rendering commands using the software service by transferring the buffer data to a resource from the shared memory buffer.

In some embodiments, the resource corresponds to at least one of a frame buffer, a vertex buffer, a texture buffer, and an index buffer.

In some embodiments, executing the rendering commands involves asynchronously creating the resource from the resource allocation command in the command buffer.

In some embodiments, executing the rendering commands involves formatting the rendering commands and sending the formatted rendering commands to a graphics-processing unit (GPU) of the computing system, which renders the image.

In some embodiments, the system also synchronizes interaction between the software client and the software service.

In some embodiments, synchronizing interaction between the software client and the software service involves at least one of:
  (i) setting or reading a pointer associated with the command buffer;
  (ii) setting or reading a token associated with the command buffer; and
  (iii) synchronizing interaction between the software client and a GPU of the computing system.

In some embodiments, the software client corresponds to at least one of a native code module, a web application, and a graphics library.

In some embodiments, the software client includes a scene graph renderer.

In some embodiments, the command buffer is a ring buffer.

In some embodiments, the ring buffer includes a put pointer corresponding to a last rendering command from the rendering commands written by the software client and a get pointer corresponding to a next rendering command from the rendering commands to be read by the software service.

In some embodiments, the get pointer is stored in shared memory between the software client and the software service.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for rendering graphics in a computing system. The computing system may be, for example, a personal computer (PC), a mobile phone, a personal digital assistant (PDA), a graphing calculator, a portable media player, a global positioning system (GPS) receiver, and/or another electronic computing device. More specifically, embodiments provide a method and system for rendering graphics using command buffers. The command buffers allow asynchronous communication to occur between a software client and a software service. Furthermore, a command buffer interface may facilitate synchronous communication between the software client and the software service.

In one or more embodiments, the software client is executed as a native code module in a secure runtime environment. The secure runtime environment may enable safe execution of the software client on the computing system by validating the native code module and restricting access to system resources. Communication with graphics hardware may be provided by the software service, which may be installed locally on the computing system as a trusted code module. Graphics rendering may thus occur by writing rendering commands to the command buffer using the software client and reading rendering commands from the command buffer using the software service. The software service may then format the rendering commands and send the formatted rendering commands to a GPU of the computing system for rendering on the GPU.

In one or more embodiments, the command buffer is used to facilitate interaction between a web application implemented using a native code module and the GPU. In other words, the native code module may write rendering commands directly into a hardware command buffer that is used by the GPU to render images for the web application. As a result, the web application may directly request execution of rendering commands by the GPU using the native code module and command buffer.

Figure 1A:
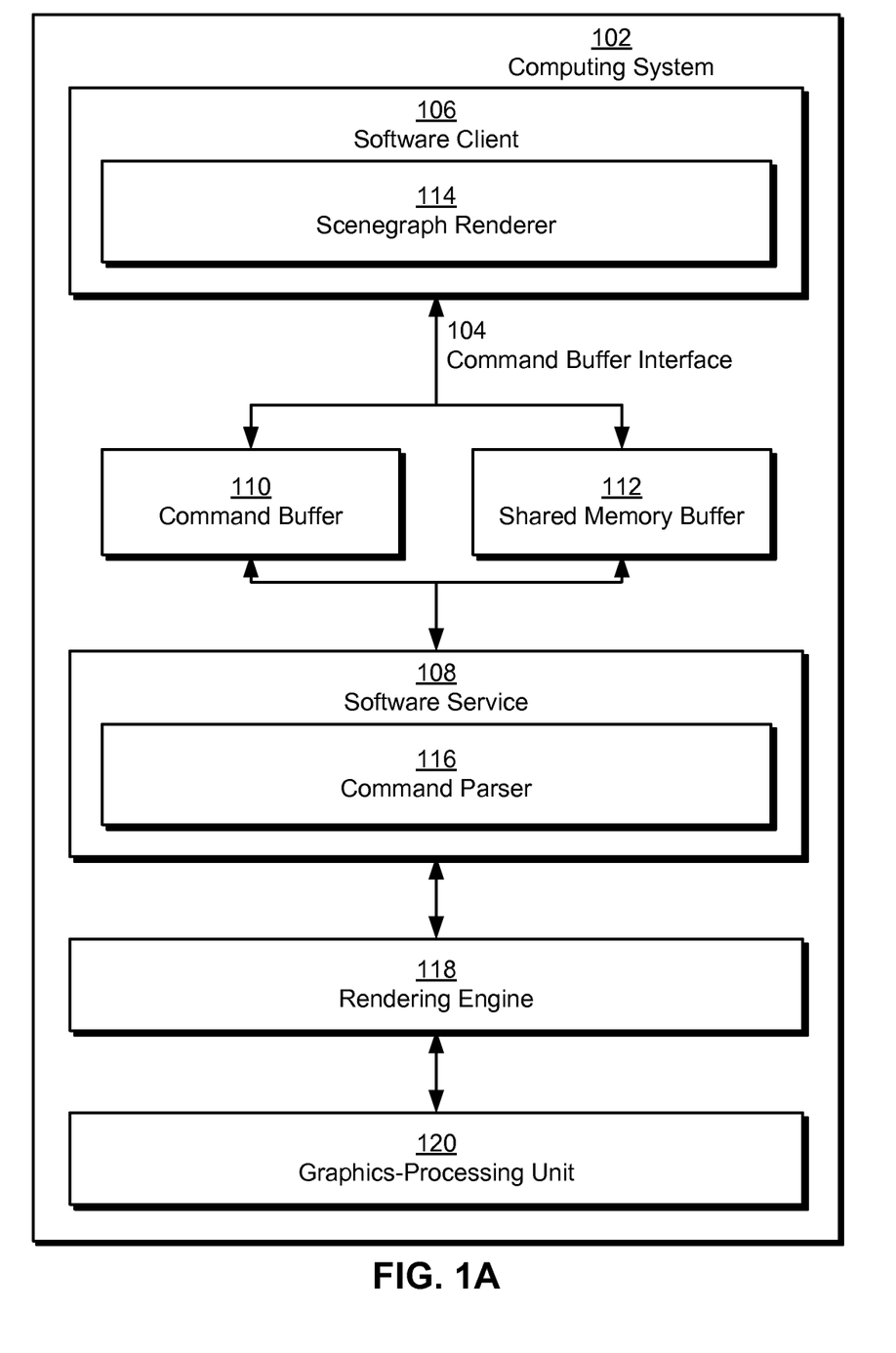
FIG. 1A shows a schematic of an embodiment of a system.

FIG. 1A shows a schematic of an embodiment of a system. More specifically, FIG. 1A shows a system for command buffer-based rendering of graphics on a computing system 102. The system includes a software client 106 and a software service 108 interacting through a command buffer interface 104, a command buffer 110, and a shared memory buffer 112. The system also includes a rendering engine 118 and graphics-processing unit (GPU) 120 for rendering an image associated with software client 106. Each component of the system is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications that perform specialized tasks for the user. For example, computing system 102 may include applications such as an email client, address book, document editor, web browser, and/or media player. To perform tasks for the user, applications may obtain the use of hardware resources (e.g., processor, memory, I/O components, wireless transmitter, GPU 120, etc.) on computing system 102 from the operating system, as well as interact with the user through a hardware and/or software framework provided by the operating system.

To enable interaction with the user, computing system 102 may include one or more hardware input/output (I/O) components, such as a pointing device and a display screen. Each hardware I/O component may additionally be associated with a software driver (not shown) that allows the operating system and/or applications on computing system 102 to access and use the hardware I/O components.

Those skilled in the art will appreciate that the functionality of certain applications on computing system 102 may depend on the applications' ability to utilize graphics hardware acceleration on computing system 102. For example, the graphics quality of a computer game may be based on the ability of the computer game to communicate with GPU 120.

Those skilled in the art will also appreciate that certain applications on computing system 102 may be unable to utilize GPU 120 in graphics rendering due to limitations in resource access and/or performance. In particular, graphics rendering for web applications may be performed using software that executes on a CPU of computing system 102 rather than GPU 120. As a result, graphics in web applications may be slow and/or suboptimal compared to graphics in native applications that employ graphics hardware acceleration.

To enable graphics support and graphics hardware acceleration for web applications, operations related to graphics processing may be offloaded to a web browser plugin in computing system 102. The plugin may expose the capabilities of GPU 120 to the web applications, thus allowing the web applications to utilize graphics hardware acceleration, including the application of vertex and pixel shaders. Plugin-based graphics hardware acceleration for web applications is described in a co-pending non-provisional application by inventors Robin Green, Evangelos Kokkevis, Matthew Papakipos and Gregg Tavares and filed 16 Jul. 2008 entitled "Web-Based Graphics Rendering System," having Ser. No. 12/174,586, which is incorporated herein by reference.

However, the plugin may correspond to a complex software system that includes a number of security vulnerabilities. Furthermore, the plugin may include a scene graph renderer 114 that includes limited ability to accept low-level graphics rendering commands. To increase the security and versatility of the plugin, the plugin may be implemented using a command buffer interface 104 between two software components: software client 106 and software service 108. Software client 106 and software service 108 may execute on separate processes within computing system 102. Furthermore, software client 106 and software service 108 may communicate and implement graphics rendering using a combination of asynchronous and synchronous mechanisms, as explained below.

As shown in FIG. 1A, scene graph renderer 114 is implemented using software client 106. In other words, software client 106 may include functionality to obtain and/or store a graphics model to be rendered for an application, such as a web application. The graphics model may include, for example, a set of shapes composed of triangles or polygons, one or more light sources, a camera, and/or one or more rendering effects (e.g., shaders, culling, blending, etc.). As described in the above-referenced application, the graphics model may additionally be stored in one or more data structures, such as scene graphs, buffers, and/or effects.

To render an image corresponding to the graphics model, software client 106 may transmit a set of rendering commands to software service 108. A command parser 116 in software service 108 may then format and/or process the rendering commands. The formatted and/or processed rendering commands may be passed from software service 108 to rendering engine 118, which executes the rendering commands by communicating with GPU 120. For example, the rendering commands may correspond to low-level commands that are parsed by command parser 116 and translated into function calls into a rendering engine such as a Direct3D (Direct3D™ is a registered trademark of Microsoft Corp.) or OpenGL (OpenGL™ is a registered trademark of Silicon Graphics, Inc.) renderer. The function calls may then be translated into graphics processing instructions for GPU 120 by the renderer. Alternatively, rendering engine 118 may interface directly with GPU 120 by issuing hardware instructions to GPU 120, or command buffer interface 104 may correspond to a direct interface with GPU 120, as described in further detail below with respect to FIG. 1B.

Those skilled in the art will appreciate that interaction between software client 106 and software service 108 may require synchronous inter-process communication (IPC) mechanisms such as message passing, remote procedure calls (RPC), and/or sockets. Such IPC mechanisms may be provided by command buffer interface 104 in the form of function calls between software client 106 and software service 108. On the other hand, IPC techniques alone may not pass individual rendering commands from software client 106 to software service 108 at a rate that is high enough to enable real-time computer graphics. For example, an RPC mechanism may be unable to support the number of function calls and/or rendering commands (e.g., one million) required to render a three-dimensional (3D) scene for a computer game at 60 frames per second.

To enable real-time rendering of 3D graphics, command buffer interface 104 may also include mechanisms by which software client 106 and software service 108 may operate asynchronously. More specifically, asynchronous communication between software client 106 and software service 108 may be enabled using command buffer 110 and shared memory buffer 112.

Command buffer 110 may be created upon loading and/or initialization of software client 106 and/or software service 108. For example, command buffer 110 may be created by software service 108 and passed to software client 106 through command buffer interface 104. Moreover, both software client 106 and software service 108 may map command buffer 110 into their respective address spaces for direct access to command buffer 110.

In one or more embodiments, command buffer 110 includes functionality to store rendering commands from software client 106 to software service 108. As described above, such rendering commands may correspond to low-level graphics rendering commands that are generated on the order of tens of thousands of rendering commands per frame. Rendering commands stored in command buffer 110 may include, for example, state change commands, resource allocation commands, direct memory access (DMA) commands, buffer data, and/or synchronization commands. Most rendering commands may not require a return value, thus allowing issuance of the rendering commands by software client 106 and execution of the rendering commands by software service 108 to be independent and/or asynchronous.

Command buffer interface 104 may allow software client 106 to write sets of rendering commands to command buffer 110. As the rendering commands are written to command buffer 110, the rendering commands may be read by command parser 116 and executed by software service 108 and/or rendering engine 118. One or more images corresponding to the rendering commands may thus be produced by GPU 120 through the transmission of rendering commands from software client 106 to software service 108 using command buffer 110.

As described above, rendering engine 118 may correspond to an OpenGL, Direct3D, and/or other renderer that interfaces with GPU 120 to render graphics. Furthermore, the functionality of rendering engine 118 may be accessed through an interface (e.g., application programming interface (API)) with other software components, such as software service 108. Consequently, software service 108 may execute rendering commands from command buffer 110 by reading and/or interpreting the rendering commands using command parser 116 and making corresponding function calls to rendering engine 118 through the interface with rendering engine 118.

In other words, software service 108 may format the rendering commands from command buffer 110 such that the rendering commands are understood by rendering engine 118 and conveyed to GPU 120 by rendering engine 118. The formatting may be accomplished by mapping each rendering command to a command table that stores API calls to rendering engine 118 for each rendering command. The rendering command may then be executed by making the API calls to rendering engine 118 using parameters and/or arguments accompanying the rendering command in command buffer 110. Encoding schemes for rendering commands are discussed in further detail below with respect to FIGS. 2A-2B.

Synchronization of actions between software client 106 and software service 108 may also be provided by command buffer interface 104. In particular, command buffer interface 104 may include mechanisms for synchronizing the writing of rendering commands to command buffer 110 by software client 106 with the reading and execution of rendering commands from command buffer 110 by software service 108. In other words, command buffer interface 104 may provide concurrency control mechanisms between software client 106 and software service 108 to enforce the correct execution of rendering commands by software service 108, rendering engine 118, and/or GPU 120.

In one or more embodiments, command buffer 110 is implemented as a ring buffer (i.e., circular buffer). Furthermore, command buffer 110 may include a set of pointers (e.g., offsets into command buffer 110) that denote the effective start and end of the ring buffer. More specifically, command buffer 110 may include a "put" pointer that represents the last rendering command written to command buffer 110 by software client 106. Command buffer 110 may also include a "get" pointer that represents the next rendering command to be read from command buffer 110 by software service 108. Consequently, command buffer interface 104 may provide mechanisms for controlling the put pointer by software client 106, controlling the get pointer by software service 108, and/or reading the values of either pointer by software client 106 and/or software service 108.

For example, the put and get pointers may both be stored in the address space of software service 108. Software client 106 may write to the put pointer and read the get pointer through a message passing and/or RPC mechanism provided by command buffer interface 104. However, because the RPC mechanism may be associated with significant overhead, software client 106 may only update the put pointer after writing a batch of (e.g., several) rendering commands to command buffer 110. Similarly, software client 106 may cache the value of the get pointer and only update the cached value when the value of the put pointer nears the value of the get pointer.

Alternatively, each pointer may be stored in the address space of the respective controlling entity. In other words, the put pointer may be stored in the address space of software client 106, and the get pointer may be stored in the address space of software service 108. Command buffer interface 104 may then provide mechanisms for sending the value of the put pointer to software service 108 and/or the value of the get pointer to software client 106. Finally, the get pointer may be stored in shared memory (e.g., shared memory buffer 112) that may be directly accessed by both software client 106 and software service 108 to reduce the need for IPC between software client 106 and software service 108. However, to store the get pointer in shared memory, command buffer interface 104 may also implement access control restrictions that prevent software client 106 from writing to the memory address corresponding to the get pointer.

Those skilled in the art will appreciate that basic ring buffer synchronization may be implemented using the get and put pointers of command buffer 110. In other words, rendering commands from the get pointer to the put pointer may correspond to rendering commands that have not been read or executed by software service 108 and should not be modified. Similarly, rendering commands from the put pointer to the get pointer may correspond to rendering commands that have been read and/or executed and can be modified. Software client 106 may continue writing rendering commands into command buffer 110 until the value of the put pointer reaches the value of the get pointer, indicating that command buffer 110 is full. Along the same lines, software service 108 may continue reading and/or executing rendering commands from command buffer 110 until the value of the get pointer reaches the value of the put pointer, indicating that command buffer 110 is empty.

Command buffer interface 104 may also enable synchronization of software client 106 and rendering engine 118 and/or GPU 120. Because graphics rendering through renderers such as OpenGL and Direct3D renderers and/or GPU 120 may also be asynchronous, notifications (e.g., rendering commands) regarding state changes in rendering engine 118 and/or GPU 120 may be useful to software client 106. For example, software client 106 may use notifications from GPU 120, such as OpenGL fences, to perform tasks such as occlusion queries and/or management of dynamic data buffers. GPU 120 execution synchronization is described in further detail below with respect to FIG. 3.

In one or more embodiments, resource allocation is managed using rendering commands that are specified by software client 106 in command buffer 110 and executed by software service 108. In particular, software client 106 may write a rendering command that specifies the creation and allocation of a particular type of resource (e.g., vertex buffer, index buffer, frame buffer, texture buffer, etc.) using an index (e.g., identifier) for the resource and a size of the resource. Upon reaching the rendering command, software service 108 may allocate space for the resource (e.g., on GPU 120) and store a handle for the resource in a resource table under the index specified by software client 106. Subsequent rendering commands from software client 106 to software service 108 involving the resource may thus be referenced by the resource's index in the resource table. Furthermore, because resources may be asynchronously allocated and managed through rendering commands in command buffer 110, delays associated with IPC mechanisms for resource creation may be avoided.

For example, software client 106 may write a rendering command into command buffer 110 for the creation of a vertex buffer. Software service 108 may then execute the rendering command by allocating the vertex buffer in GPU 120 through one or more API calls and store the handle for the vertex buffer in the resource table under the index specified in the rendering command. Software client 106 may also write rendering commands into command buffer 110 for clearing, reading from, and/or writing to the vertex buffer by software service 108 using the vertex buffer's index.

Those skilled in the art will appreciate that graphics rendering (e.g., 3D graphics rendering) may involve the storage and transmission of large amounts of buffer data. For example, rendering of a single frame in a 3D computer game may require the storage and transmission of several to tens of megabytes of vertex, texture, index, and/or frame buffer data between software client 106 and software service 108. Such buffer data may be written to command buffer 110 by software client 106 along with commands for processing and/or rendering the data. However, the buffer data may exceed the allocated size of command buffer 110 and/or preclude rendering commands from being stored in command buffer 110 until the buffer data is read from command buffer 110 by software service 108.

To address the storage limitations of command buffer 110, command buffer interface 104 may include functionality to allocate a shared memory buffer 112 for storing buffer data associated with graphics rendering. Shared memory buffer 112 may include frame, vertex, texture, and/or index buffer data to be transmitted from software client 106 to software service 108. In one or more embodiments, shared memory buffer 112 is created by software client 106 during initialization of software client 106 and shared with software service 108 using an IPC mechanism (e.g., RPC, message passing, socket call, etc.). In addition, software client 106 may create multiple shared memory buffers 112 to organize the allocation of resources and/or store rendering data for multiple software clients. Alternatively, shared memory buffer 112 may be created by software service 108 during initialization of software service 108 and shared with software client 106 using IPC. The shared nature of shared memory buffer 112 may additionally allow both software client 106 and software service 108 to directly access (e.g., read from, write to, etc.) shared memory buffer 112 from their respective address spaces.

To transmit data to software service 108 using shared memory buffer 112, software client 106 may write the data directly to shared memory buffer 112. Software client 106 may then write a rendering command to command buffer 110 that prompts software service 108 to transfer the data in shared memory buffer 112 to a resource managed by software service 108. After software service 108 executes the transfer command, the data in shared memory buffer 112 may be modified or freed by software client 106.

For example, software client 106 may write several megabytes of vertex buffer data into shared memory buffer 112. Software client 106 may then write a rendering command into command buffer 110 for transferring the vertex buffer data in shared memory buffer 112 into a vertex buffer managed by software service 108 (e.g., stored in a resource table managed by software service 108). The transfer command may include the offset of the vertex buffer data in shared memory buffer 112 and the index of the vertex buffer in the resource table. To execute the transfer command, software service 108 may use the offset of the vertex buffer data to locate the vertex buffer data and the index of the vertex buffer to copy the vertex buffer data to the vertex buffer. After the vertex buffer data is copied, software client 106 may modify or free the vertex buffer data from shared memory buffer 112. For example, software client 106 may write more vertex buffer data for copying into the vertex buffer into shared memory buffer 112, or software client 106 may write index buffer data to be copied into an index buffer into shared memory buffer 112.

In one or more embodiments, state changes produced by software service 108 are tracked using a token. Such state changes may involve, for example, transfer of data in shared memory buffer 112, rendering engine 118, and/or GPU 120. The token may be stored in the address space of software service 108 and updated by software service 108 with a particular identifier (e.g., an integer) to reflect the completed execution of a rendering command. The identifier may further be provided by software client 106 through a "SetToken" rendering command written to command buffer 110. Software client 106 may then obtain the value of the token using a synchronous (e.g., socket) call with software service 108. In other words, software client 106 may instruct software service 108 to track certain changes in state by executing the "SetToken" rendering command after executing one or more rendering commands that cause each of the changes in state.

For example, software client 106 may write a "SetToken" rendering command that increments the token after each important rendering command (e.g., transfer commands, GPU 120 state change commands, etc.) in command buffer 110. Upon executing an important rendering command in command buffer 110, software service 108 increments the token to indicate that the important rendering command has been completed. Consequently, the token may allow software client 106 to obtain information about multiple state changes (e.g., executed rendering commands) in a single IPC query to software service 108 rather than repeatedly requesting the value of the get pointer in more frequent IPC queries. More specifically, the token may provide another synchronization mechanism between various independently executing components of computing system 102, such as software client 106, software service 108, rendering engine 118, and/or GPU 120.

As mentioned previously, software service 108 may operate in conjunction with multiple software clients. Such software clients may include, for example, web applications, graphics libraries, and/or native code modules. As a result, software service 108 may include multiple command buffer interfaces to facilitate secure operation with different types of software clients. For example, command buffer interface 104 may include bindings for general-purpose languages such as C++ as well as higher-level languages for web applications such as Javascript (Javascript™ is a registered trademark of Sun Microsystems, Inc.). Command buffer interface 104 may also allow graphics libraries such as OpenGL and Direct3D to be re-implemented as software client 106. For example, command buffer interface 104 may connect an OpenGL software client 106 that communicates with software service 108 to render using a Direct3D rendering engine 118 and vice versa.

Furthermore, the independent execution of software service 108 and software client 106 may facilitate safer execution of applications that request GPU 120 resources. In particular, the parsing and processing of rendering commands by software service 108 prior to communicating with rendering engine 118 and/or GPU 120 may prevent applications that run as software clients from directly accessing GPU 120, portions of memory, and/or other resources on computing system 102. As a result, the system of FIG. 1A may reduce the incidence of system crashes, graphics driver bugs, file system corruption, and/or other security-related issues. The security and safety of graphics rendering may additionally be increased by executing software client 106 in a native code module, as discussed below with respect to FIGS. 1B-1C.

Figure 1B:
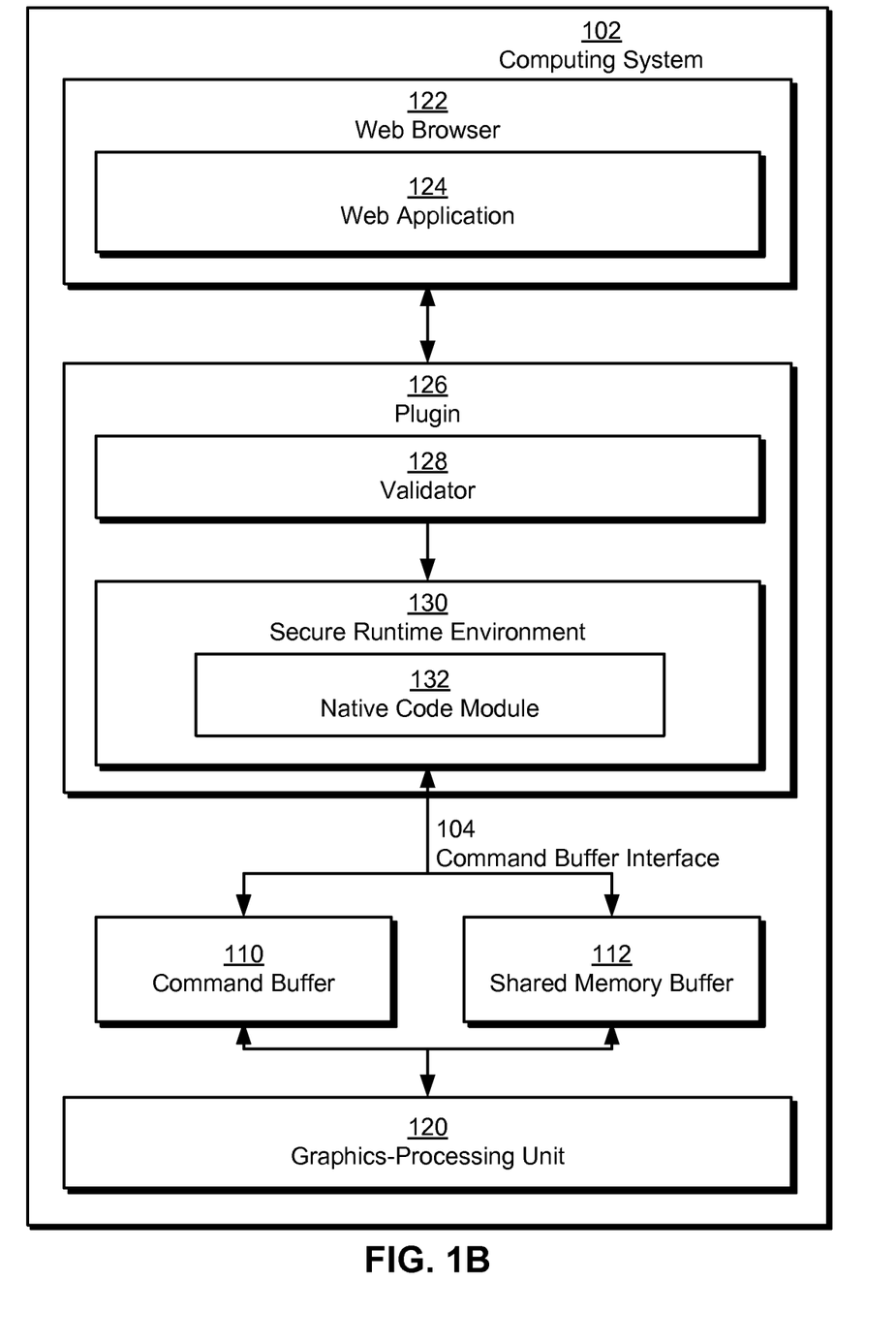
FIG. 1B shows a schematic of an embodiment of a system.

FIG. 1B shows a schematic of an embodiment of a system. More specifically, FIG. 1B shows a system for providing hardware-accelerated graphics rendering to a web application 124. As shown in FIG. 1B, web application 124 executes within a web browser 122 on computing system 102. Web application 124 may be obtained from a server using a network connection with the server and loaded within web browser 122. For example, web application 124 may be downloaded from an application server over the Internet by web browser 122. Furthermore, web application 124 may execute on computing system 102 regardless of the type of platform (e.g., operating system, drivers, etc.) associated with computing system 102.

Once loaded, web application 124 may provide features and user interactivity comparable to that of native applications on computing system 102. For example, web application 124 may function as an email client, document editor, media player, computer-aided design (CAD) system, and/or computer game. Web application 124 may also include dynamic user interface elements such as menus, buttons, windows, sub-windows, icons, animations, and/or other graphical objects that emulate analogous user interface elements in native applications. In other words, web application 124 may correspond to a rich Internet application (RIA).

More specifically, web application 124 may include graphics rendering capabilities that are typically associated with native applications, such as graphics hardware acceleration using GPU 120. To render graphics using GPU 120, a native code module 132 associated with web application 124 may be used as software client 106. Like web application 124, native code module 132 may be obtained from one or more servers by web browser 122. Furthermore, native code module 132 may be executed natively within a plugin 126 associated with web browser 122 to provide hardware-accelerated graphics rendering capabilities to web application 124. Alternatively, some or all of web application 124 may execute within native code module 132.

In one or more embodiments, plugin 126 includes a variety of mechanisms to ensure the safe execution of native code module 132. In particular, native code module 132 may be validated by a validator 128 provided by plugin 126 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 132 is validated, native code module 132 may be loaded into a secure runtime environment 130 provided by plugin 126. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference.

Furthermore, because native code module 132 may include binary code that runs directly on hardware, native code module 132 may be platform independent with respect to the operating system of computing system 102, web browser 122, and/or other software components on computing system 102. As described in the above-referenced applications, plugin 126 and/or native code module 132 may also include mechanisms for executing on a variety of instruction set architectures, including the use of "fat binaries" and binary translators.

As shown in FIG. 1B, native code module 132 communicates directly with GPU 120 through command buffer interface 104. In other words, native code module 132 may write GPU commands and buffer data directly into a hardware command buffer 110 and/or shared memory 112 located on GPU 120. Alternatively, native code module 132 may write GPU commands and/or buffer data into memory locations that are directly accessible by GPU 120 using function calls provided by command buffer interface 104 (e.g., a GPU interface). Consequently, the system of FIG. 1B provides a mechanism for communication between GPU 120 and web application 124 while ensuring the safe execution of rendering commands using native code module 132, secure runtime environment 130, and/or validator 128.

Figure 1C:
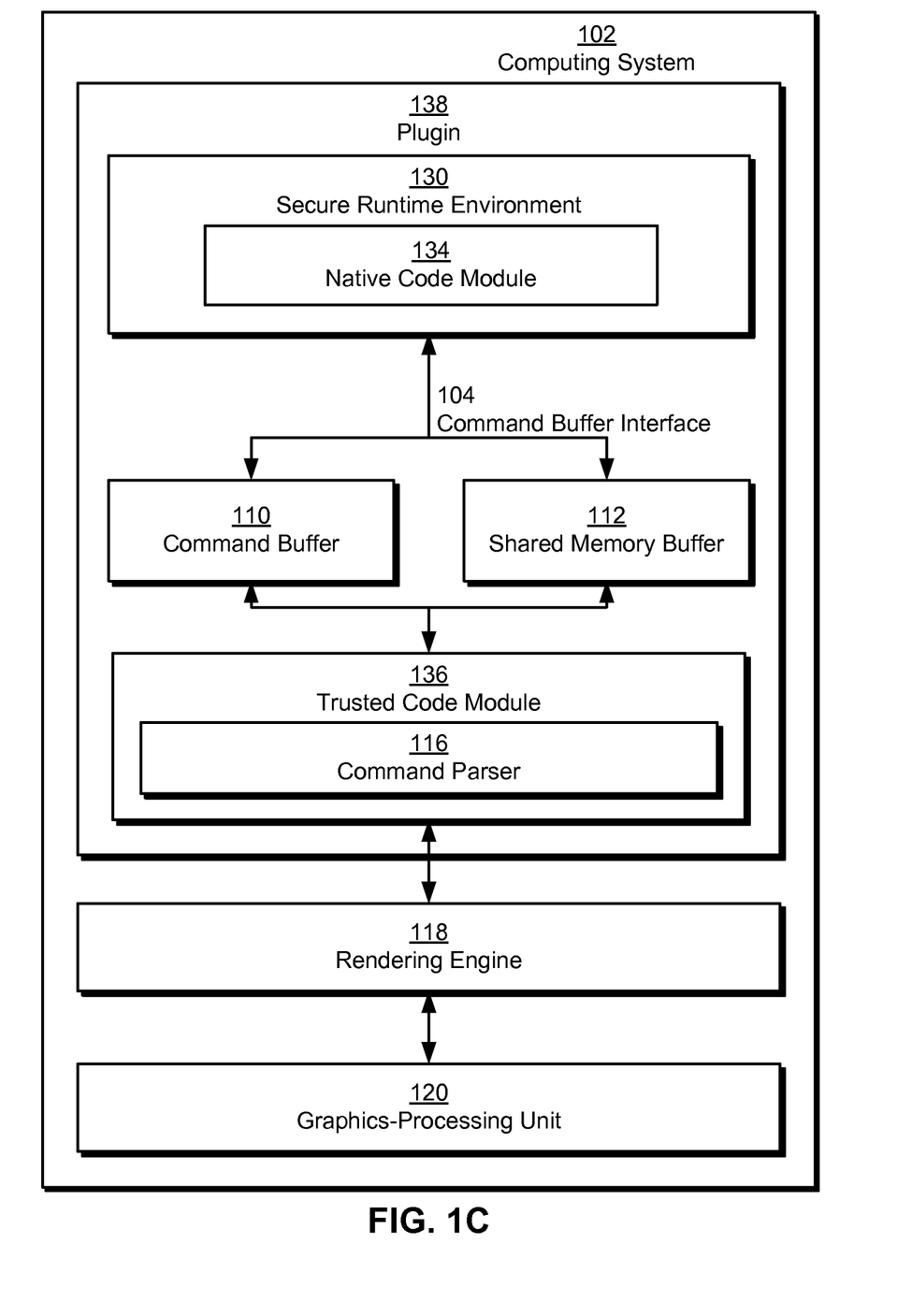
FIG. 1C shows a schematic of an embodiment of a system.

FIG. 1C shows a schematic of an embodiment of a system in accordance with an embodiment. In particular, FIG. 1C shows a system for implementing a secure plugin 138 that provides graphics hardware acceleration for web applications on computing system 102. The functionality of plugin 138 is described in a co-pending non-provisional application by inventors Robin Green, Evangelos Kokkevis, Matthew Papakipos and Gregg Tavares and filed 16 Jul. 2008 entitled, "WEB-BASED GRAPHICS RENDERING SYSTEM," having Ser. No. 12/174,586, which is incorporated herein by reference.

As shown in FIG. 1C, plugin 138 includes native code module 134 executing in secure runtime environment 130. As described above, native code module 134 may function as a safely executing software client 106. As a result, native code module 134 may provide a scene graph renderer (e.g., scene graph renderer 114 of FIG. 1A) to web applications that use plugin 138. Native code module 134 may then communicate with a trusted code module 136 using command buffer interface 104, command buffer 110, and/or shared memory 112. As a result, trusted code module 136 may implement the functionality of software service 108.

In other words, native code module 134 may correspond to untrusted code that executes safely within secure runtime environment 130. However, because secure runtime environment 130 may not allow communication with hardware devices such as GPU 120, native code module 134 may use command buffer interface 104 to interact with trusted code module 136, which executes outside secure runtime environment 130 and includes the capability to communicate with GPU 120. Trusted code module 136 may also use command buffer interface 104 to process rendering commands from native code module 134 and to send the rendering commands to rendering engine 118 and/or GPU 120. Because the majority of plugin 138 may be implemented and executed using native code module 134, plugin 138 may operate in a manner that minimizes the risk of crashes, bugs, and/or security vulnerabilities in computing system 102.

Figure 2A:
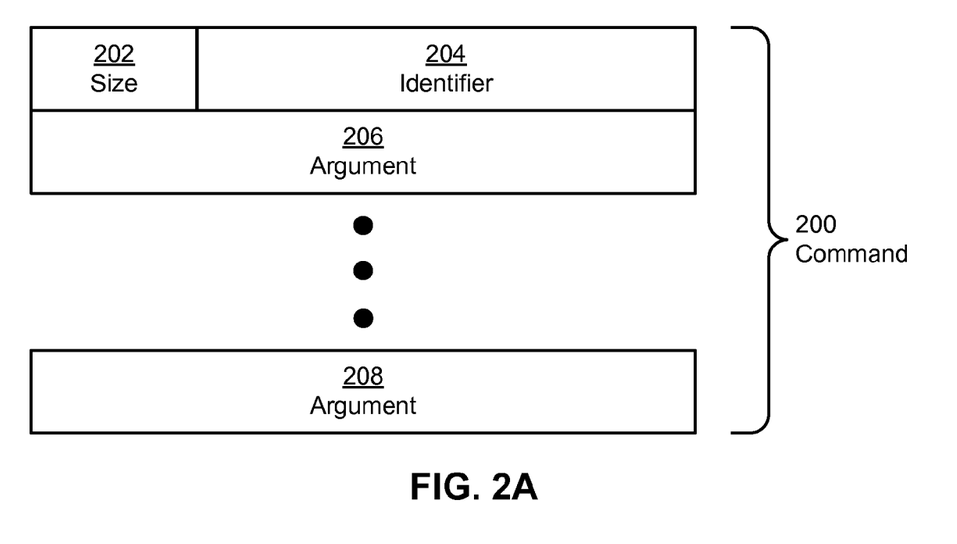
FIG. 2A shows a command.

FIG. 2A shows a command 200 (e.g., rendering command). In particular, FIG. 2A shows an encoding scheme for a rendering command 200 that may be written by a software client (e.g., software client 106 of FIG. 1A) to a command buffer. Rendering command 200 may then be read and decoded from the command buffer by a software service (e.g., software service 108 of FIG. 1A) for execution on a GPU.

As shown in FIG. 2A, command 200 includes a size 202, an identifier 204, and a set of arguments 206-208. Size 202 and identifier 204 may be stored on the same element of the command buffer, while arguments 206-208 may each be stored on an element of the command buffer. For example, if elements in the command buffer correspond to 32-bit words, size 202 may occupy the upper eight bits of an element and identifier 204 may occupy the lower 24 bits of the element. Arguments 206-208 may also be padded to 32 bits for storage in the command buffer. Alternatively, multiple arguments may also be stored on the same element, as discussed below with respect to FIG. 2B.

Size 202 may represent the total size of command 200 in the number of elements in the command buffer taken up by command 200. In other words, size 202 may correspond to the number of arguments 206-208 in command 200 incremented by one. As a result, if size 202 is stored in the upper eight bits of a 32-bit element, command 200 may not exceed 255 elements. Identifier 204 may allow command 200 to be identified and executed by the software service. For example, identifier 204 may correspond to an index in a global command table that is managed by the software service. The index may map to a set of function calls that may be made by the software service to a rendering engine or GPU to carry out the functionality of command 200. Alternatively, command 200 may correspond to a resource allocation, DMA, and/or synchronization command that may be completed solely by the software service. Arguments 206-208 may correspond to the parameters of command 200.

Figure 2B:
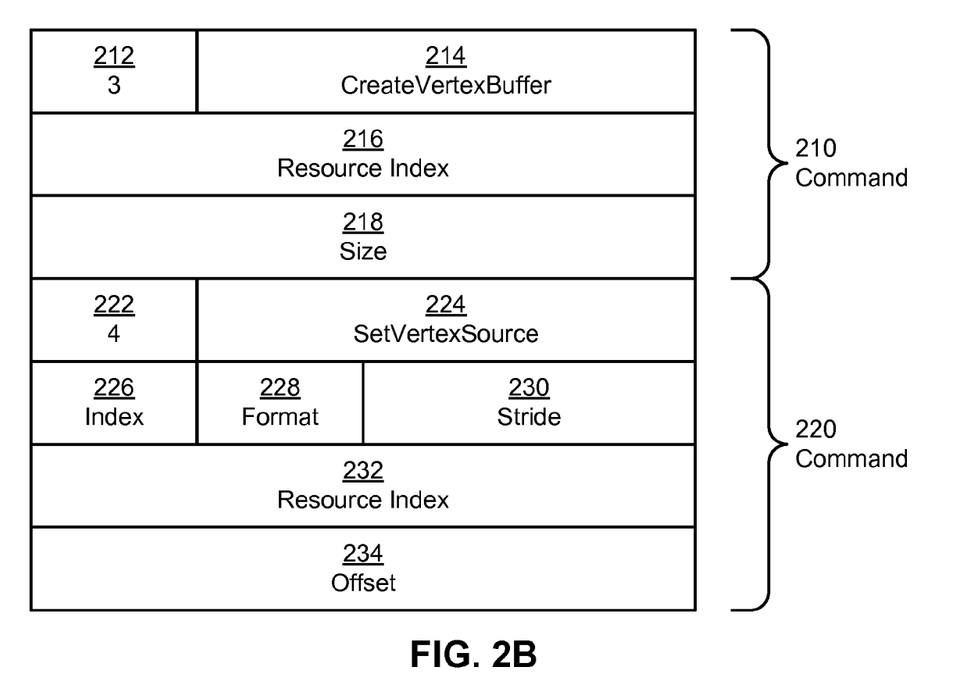
FIG. 2B shows a set of exemplary commands.

FIG. 2B shows a set of exemplary commands 210 and 220. As shown in FIG. 2B, commands 210 and 220 are encoded using the scheme illustrated in FIG. 2A. More specifically, command 210 includes a size 212 of "3" (e.g., three elements), an identifier 214 corresponding to "CreateVertexBuffer," and arguments 216-218 corresponding to "Resource Index" and "Size," respectively.

Command 220 includes a size 222 of "4" (e.g., four elements), an identifier 224 corresponding to "SetVertex- Source," and five arguments 226-234 (e.g., "Index," "Format," "Stride," "Resource Index," and "Offset"). Unlike command 210, command 220 includes three arguments 226-230 in the same element of the command buffer. For example, in a 32-bit word element, arguments 226-228 may each occupy eight bits, while argument 230 may occupy 16 bits. Consequently, shorter arguments in a command (e.g., command 220) may be stored in the same command buffer element of the command buffer. Decoding of commands and arguments may be accomplished by obtaining the encoding scheme of each command by looking up the command's index and/or identifier in the global command table.

Figure 3:
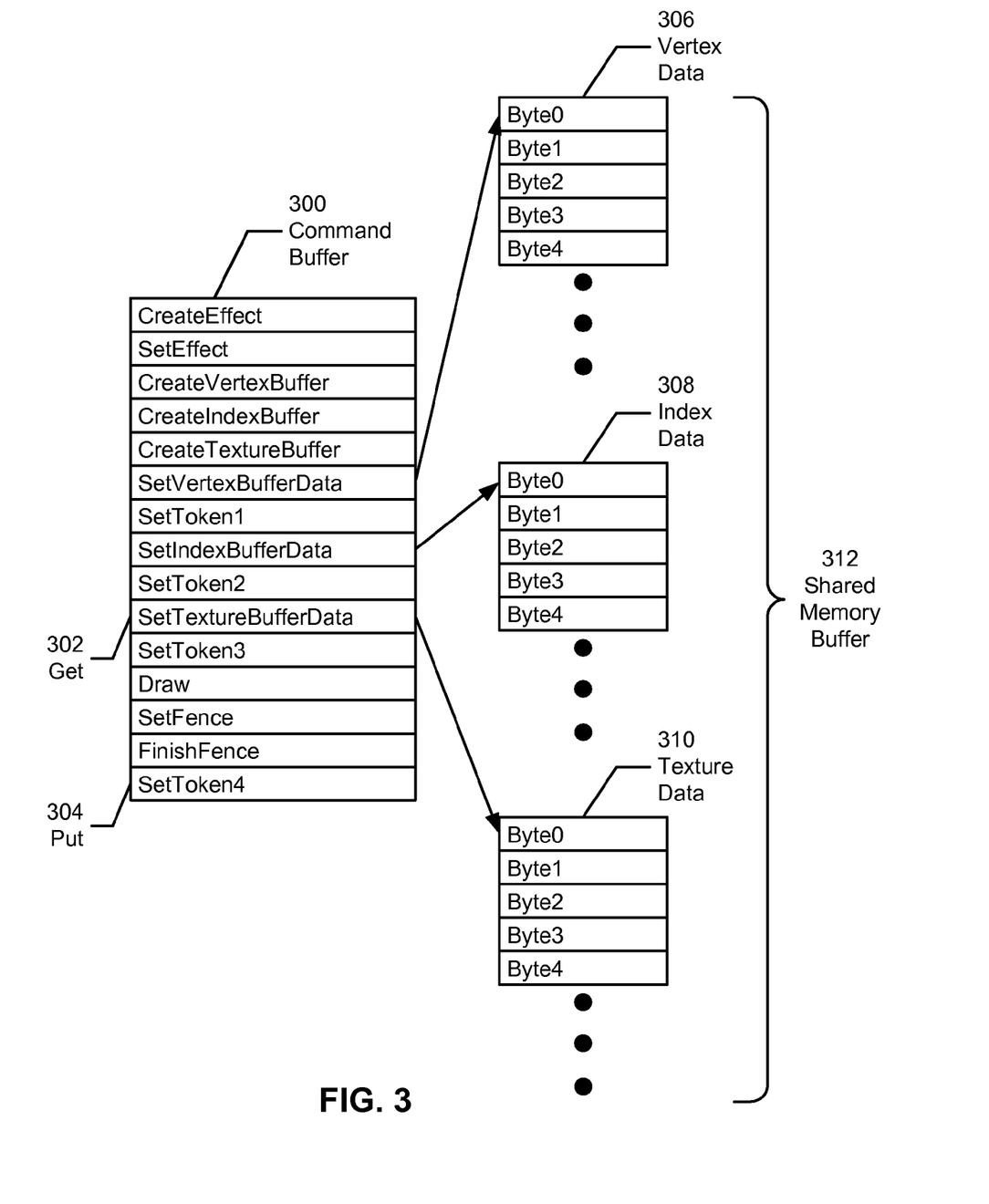
FIG. 3 shows an exemplary command.

FIG. 3 shows an exemplary command buffer 300. As described above, command buffer 300 may correspond to a ring buffer that includes a get 302 pointer and a put 304 pointer, as well as a series of rendering commands. Get 302 may correspond to the next rendering command to be read by a software service executing the rendering commands, and put 304 may correspond to the last rendering command written to command buffer 300 by a software client.

Rendering commands between get 302 and put 304 (e.g., "SetTextureBufferData," "SetToken3," "Draw," "SetFence," "FinishFence," "SetToken4") may correspond to commands that are to be executed by the software service, while rendering commands not between get 302 and put 304 may correspond to commands that have already been executed by the software service. As a result, rendering commands outside of the commands between get 302 and put 304 may be rewritten with new rendering commands by the software client. For example, the software client may add two new rendering commands to command buffer 300 by writing the new rendering commands to the elements containing "CreateEffect" and "SetEffect" and updating put 304 to point to the location of the "CreateEffect" command.

Rendering commands in command buffer 300 may also reference a shared memory buffer 312 that is also accessible to the software client and software service. In particular, vertex data 306, index data 308, and texture data 310 may be written in bytes to shared memory buffer 312 by the software client. The software client may then write transfer commands to command buffer 300 that reference the data. In particular, "SetVertexBufferData" references vertex data 306, "SetIndexBufferData" references index data 308, and "SetTextureBufferData" references texture data 310. When the software service reaches a transfer command, the software service may use the reference (e.g., offset) and/or other arguments (e.g., length, resource index, etc.) in the transfer command to locate the relevant data and copy the data to a resource managed by the software service. For example, "SetVertexBufferData" may copy vertex data 306 to a vertex buffer, "SetIndexBufferData" may copy index data 308 to an index buffer, and "SetTextureBufferData" may copy texture data 310 to a texture buffer.

After executing a transfer command in command buffer 300, the software service may set a token indicating completion of the data transfer. For example, after executing "SetVertexBufferData," the software service may execute "SetToken1," which may set the token to the value "1." After executing "SetIndexBufferData," the software service may set the token to the value "2" using the command "SetToken2." After executing "SetTextureBufferData," the software service may set the token to the value "3" using the command "SetToken3." The software client may determine the progress of the software service by obtaining the value of the token through an IPC mechanism rather than repeatedly obtaining the value of get 302.

Command buffer 300 may also include commands for synchronizing the software client and the GPU rendering the image corresponding to the rendering commands. In particular, "SetFence" may correspond to a synchronization command that can be queried for completion of a rendering command by the GPU. For example, "SetFence" may prompt the software service to set an OpenGL fence with the GPU. Similarly, "FinishFence" may not return until the GPU has finished executing the condition specified in "SetFence." The software client may also write "SetToken4" to command buffer 300 after "SetFence" as a state change notification indicating that the fence has finished executing. The software client may subsequently receive the state change notification as an updated token value (e.g., "4") after the software service executes "SetToken4" in command buffer 300.

Figure 4:
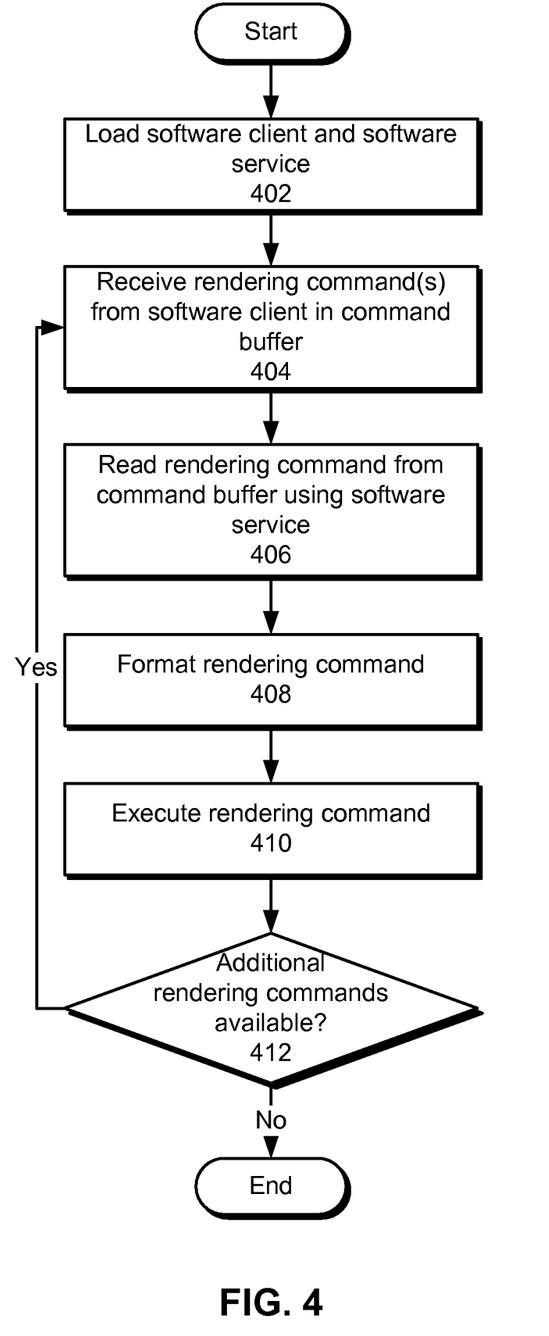
FIG. 4 shows a flowchart illustrating the process of rendering graphics in a computing system.

FIG. 4 shows a flowchart illustrating the process of rendering graphics in a computing system. In one or more embodiments, one or more of the steps may be omitted, repeated, and/or performed in a different order. Accordingly, the specific arrangement of steps shown in FIG. 4 should not be construed as limiting the scope of the technique.

Initially, a software client and a software service are loaded (operation 402) in the computing system. The software client and software service may correspond to independently executing software components of the computing system. In addition, loading of the software client and software service may involve creating and sharing a command buffer and/or one or more shared memory buffers between the software client and software service. In particular, each buffer (e.g., command buffer, shared memory buffer) may be created by either the software client or software service. The buffer may then be provided to the other software component using an IPC mechanism and mapped to both components' address spaces. As a result, the command buffer and shared memory buffer(s) may be directly accessed by both the software client and the software service.

Next, one or more rendering commands are received from the software client in the command buffer (operation 404). The rendering commands may correspond to state change commands, resource allocation commands, DMA commands, buffer data, and/or synchronization commands. The rendering commands may be written to the command buffer by the software client to enable asynchronous interaction between the software client and the software service. After the rendering commands are written to the command buffer by the software client, a put pointer in the command buffer is updated by the software client. The new value of the put pointer may signal the software service to begin reading rendering commands from the command buffer (operation 406) in the order in which the rendering commands were written to the command buffer by the software client.

Each rendering command may then be formatted (operation 408) and executed (operation 410) by the software service and/or a GPU on the computing system. For example, the rendering command may be encoded with an identifier that maps to a global command table managed by the software service. The software service may use the global command table to decode the command in the command buffer and obtain a set of function calls to the GPU that implement the functionality of the rendering command. In addition, the software service may make the function calls using arguments stored with the rendering command in the command buffer. On the other hand, certain rendering commands, such as resource allocation commands, DMA commands, and/or state change commands, may not require GPU execution and may be carried out by the software service. For example, the software service may execute a transfer command by copying data in the shared memory buffer to a resource such as a vertex buffer.

The software client and/or software service may continue executing if additional rendering commands are available (operation 412). In particular, the software client may continue writing commands to the command buffer (operation 404) and updating the put pointer. The software service may concurrently read each rendering command (operation 406), format the rendering command (operation 408), and execute the rendering command (operation 410). As described above, synchronization (e.g., IPC) mechanisms using a get pointer, put pointer, and/or token may be used to synchronize the execution of the software client and software service. One or more images related to the rendering commands may thus be produced by the combined synchronous and asynchronous interaction of the software client and the software service.

The foregoing descriptions of embodiments have been presented only for purposes of illustration and description. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A system for rendering graphics in a computing system, comprising:
    a command buffer configured to store a set of rendering commands, wherein the rendering commands include at least one of a state change command, a resource allocation command, a direct memory access (DMA) command, and buffer data;
    a software client configured to write the rendering commands into the command buffer;
    a software service comprising a command parser executing in a local trusted code module, wherein the software service is configured to render an image corresponding to the rendering commands by:
        reading the rendering commands from the command buffer using the command parser; and
        executing the rendering commands by providing corresponding function calls to a rendering engine; and
    a command buffer interface configured to synchronize interaction between the software client and the software service by at least one of:
        setting or reading a pointer associated with the command buffer; and
        setting or reading a token associated with the command buffer.

2. The system of claim 1, further comprising:
    a shared memory buffer configured to store the buffer data, wherein the software client is further configured to write the buffer data to the shared memory buffer, and
    wherein the software service is further configured to execute the rendering commands by transferring the buffer data to a resource from the shared memory buffer.

3. The system of claim 2, wherein the resource corresponds to at least one of a frame buffer, a vertex buffer, a texture buffer, and an index buffer.

4. The system of claim 2, wherein executing the rendering commands involves asynchronously creating the resource from the resource allocation command in the command buffer.

5. The system of claim 1, wherein executing the rendering commands involves:
    formatting the rendering commands; and
    sending the formatted rendering commands to a graphics-processing unit (GPU) of the computing system, wherein the image is rendered by the GPU.

6. The system of claim 1, wherein the set of rendering commands further includes a synchronization command and, wherein synchronizing interaction between the software client and the software service involves:
    synchronizing interaction between the software client and a GPU of the computing system.

7. The system of claim 1, wherein the software client corresponds to at least one of a native code module, a web application and a graphics library.

8. The system of claim 1, wherein the software client comprises a scene graph renderer.

9. The system of claim 1, wherein the command buffer comprises a ring buffer.

10. The system of claim 9, wherein the ring buffer comprises:
    a put pointer corresponding to a last rendering command from the rendering commands written by the software client; and
    a get pointer corresponding to a next rendering command from the rendering commands to be read by the software service.

11. The system of claim 10, wherein the get pointer is stored in shared memory between the software client and the software service.

12. A system for rendering graphics in a computing system, comprising:
    a command buffer configured to store a set of rendering commands;
    a web application implemented using a validated native code module executing in a secure runtime environment, wherein the web application is configured to write the rendering commands into the command buffer;
    a validator configured to validate the native code module prior to execution in the secure runtime environment; and
    a graphics-processing unit (GPU) configured to render an image corresponding to the rendering commands by:
        reading the rendering commands from the command buffer; and
        executing the rendering commands.

13. The system of claim 12, further comprising:
    a shared memory buffer configured to store buffer data associated with the rendering commands,
    wherein the web application is further configured to write the buffer data into the shared memory buffer, and
    wherein the GPU is further configured to execute the tendering commands by reading the data from the shared memory buffer.

14. The system of claim 12, further comprising:
    a command buffer interface configured to synchronize interaction between the web application and the GPU.

15. The system of claim 12, wherein the command buffer comprises a ring buffer.

16. A computer-implemented method for rendering graphics in a computing system, comprising:
    loading a software client and a software service comprising a command parser in the computing system, wherein the software service executes in a local trusted code module;
    receiving a set of rendering commands from the software client in a command buffer, wherein the rendering commands include at least one of a state change command, a resource allocation command, a direct memory access (DMA) command, and buffer data;

using the software service to render an image corresponding to the rendering commands by:
  reading the rendering commands from the command buffer using the command parser; and
  executing the rendering commands by providing corresponding function calls to a rendering engine; and
synchronizing interaction between the software client and the software service by at least one of:
  setting or reading a pointer associated with the command buffer; and
  setting or reading a token associated with the command buffer.

17. The method of claim 16, further comprising:
writing the buffer data to a shared memory buffer using the software client; and
further executing the rendering commands using the software service by transferring the buffer data to a resource from the shared memory buffer.

18. The method of claim 17, wherein the resource corresponds to at least one of a frame buffer, a vertex buffer, a texture buffer, and an index buffer.

19. The method of claim 17, wherein executing the rendering commands involves asynchronously creating the resource from the resource allocation command in the command buffer.

20. The method of claim 16, wherein executing the rendering commands involves:
formatting the rendering commands; and
sending the formatted rendering commands to a graphics-processing unit (GPU) of the computing system, wherein the image is rendered by the GPU.

21. The method of claim 16, wherein the set of rendering commands further includes a synchronization command and, wherein synchronizing interaction between the software client and the software service involves:
synchronizing interaction between the software client and a GPU of the computing system.

22. The method of claim 16, wherein the software client corresponds to at least one of a native code module, a web application, and a graphics library.

23. The method of claim 16, wherein the software client comprises a scene graph renderer.

24. The method of claim 16, wherein the command buffer comprises a ring buffer.

25. The method of claim 24, wherein the ring buffer comprises:
a put pointer corresponding to a last rendering command from the rendering commands written by the software client; and
a get pointer corresponding to a next rendering command from the rendering commands to be read by the software service.

26. The method of claim 25, wherein the get pointer is stored in shared memory between the software client and the software service.

27. A non-transitory computer-readable storage medium storing instructions that when executed by a computer cause the computer to perform a method for rendering graphics in a computing system, the method comprising:
loading a software client and a software service comprising a command parser in the computing system, wherein the software service executes in a local trusted code module;
receiving a set of rendering commands from the software client in a command buffer, wherein the rendering commands include at least one of a state change command, a resource allocation command, a direct memory access (DMA) command, and vertex buffer data;

using the software service to render an image corresponding to the rendering commands by:
  reading the rendering commands from the command buffer using the command parser; and
  executing the rendering commands by providing corresponding function calls to a rendering engine; and
synchronizing interaction between the software client and the software service by at least one of:
  setting or reading a pointer associated with the command buffer; and
  setting or reading a token associated with the command buffer.

28. The non-transitory computer-readable storage medium of claim 27, the method further comprising:
writing the buffer data to a shared memory buffer using the software client; and
further executing the rendering commands using the software service by transferring the buffer data to a resource from the shared memory buffer.

29. The non-transitory computer-readable storage medium of claim 28, wherein the resource corresponds to at least one of a frame buffer, a vertex buffer, a texture buffer, and an index buffer.

30. The non-transitory computer-readable storage medium of claim 28, wherein executing the rendering commands involves asynchronously creating the resource from the resource allocation command in the command buffer.

31. The non-transitory computer-readable storage medium of claim 27, wherein executing the rendering commands involves:
formatting the rendering commands; and
sending the formatted rendering commands to a graphics-processing unit (GPU) of the computing system, wherein the image is rendered by the GPU.

32. The non-transitory computer-readable storage medium of claim 27, wherein the set of rendering commands further includes a synchronization command and, wherein synchronizing interaction between the software client and the software service involves:
synchronizing interaction between the software client and a GPU of the computing system.

33. The non-transitory computer-readable storage medium of claim 27, wherein the software client corresponds to at least one of a native code module, a web application, and a graphics library.

34. The non-transitory computer-readable storage medium of claim 27, wherein the software client comprises a scene graph renderer.

35. The non-transitory computer-readable storage medium of claim 27, wherein the command buffer comprises a ring buffer.

36. The non-transitory computer-readable storage medium of claim 35, wherein the ring buffer comprises:
a put pointer corresponding to a last rendering command from the rendering commands written by the software client; and
a get pointer corresponding to a next rendering command from the rendering commands to be read by the software service.

37. The non-transitory computer-readable storage medium of claim 36, wherein the get pointer is stored in shared memory.

38. A system for rendering graphics in a computer system, comprising:
a command buffer configured to store a set of rendering commands, wherein the rendering commands include at least one of a state change command, a resource allocation command, a direct memory access (DMA) command, vertex buffer data, and a synchronization command;
a native code module comprising a scene graph renderer that executes in a secure runtime environment, wherein the native code module is configured to write the rendering commands into the command buffer;
a validator configured to validate the native code module prior to execution within the secure runtime enviroment; and
a trusted code module configured to render an image corresponding to the rendering commands written to the command buffer by the validated native code module executing within the secure runtime environment by:
reading the rendering commands from the command buffer; and
executing the rendering commands.

* * * * *